Nov. 14, 1933.  C. J. SCUDDER  1,935,335
LATERAL COMPENSATOR CONNECTION FOR VEHICLE TRUCKS
Filed Feb. 11, 1931  2 Sheets-Sheet 1
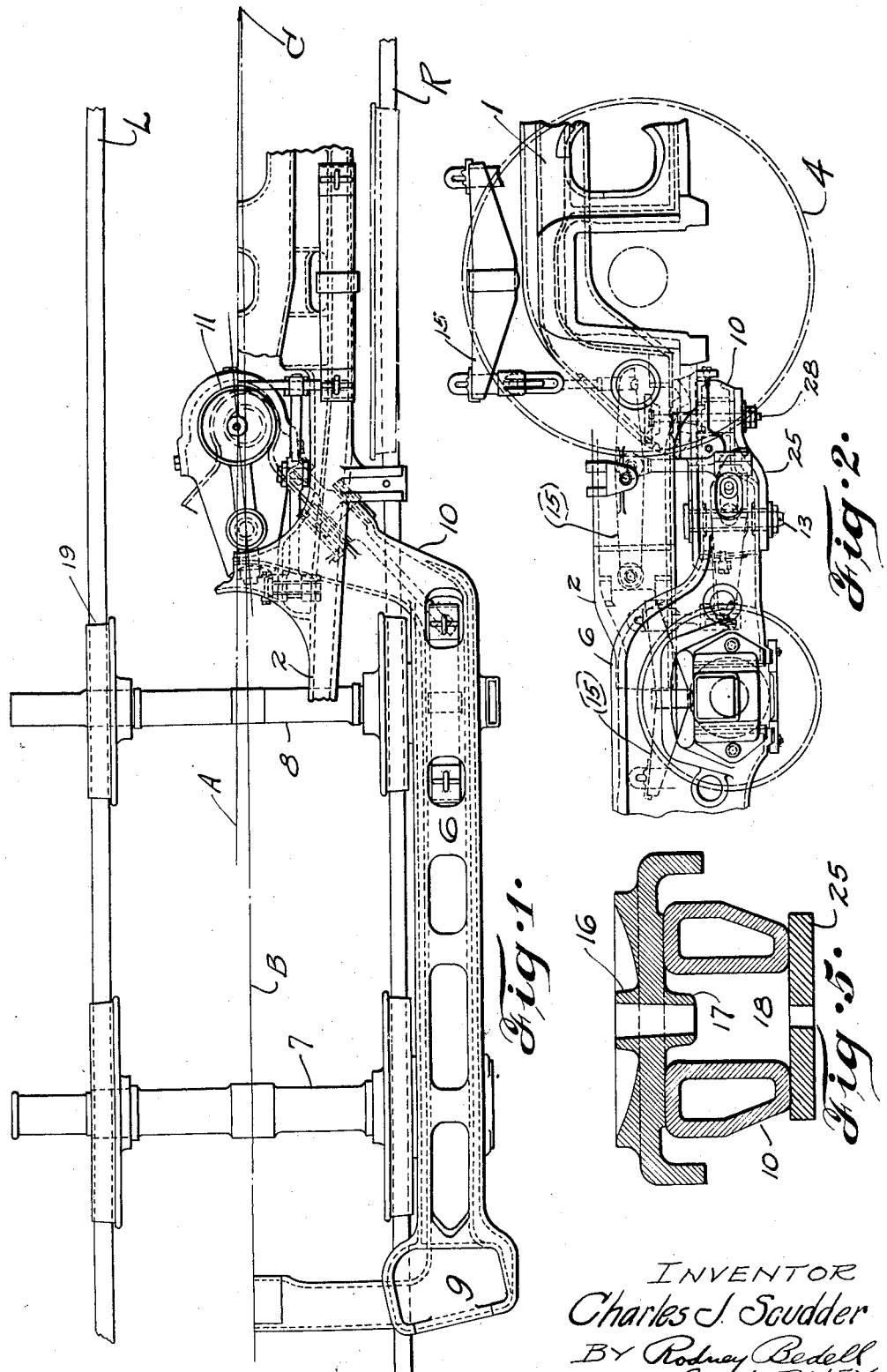
INVENTOR
Charles J. Scudder
BY Rodney Bedell
ATTORNEY INVENTOR
Charles J. Scudder
BY Rodney Bedell
ATTORNEY Patented Nov. 14, 1933

1,935,335

UNITED STATES PATENT OFFICE 1,935,335

LATERAL COMPENSATOR CONNECTION FOR VEHICLE TRUCKS

Charles J. Scudder, Scranton, Pa.

Application February 11, 1931. Serial No. 515,033

14 Claims. (Cl. 105—174)

My invention relates to railway rolling stock and consists in a novel pivotal connection between a vehicle frame and a radial truck beneath the frame. A condition for which my invention is particularly adapted is present in many locomotives. I shall state the problem arising from this condition and my solution thereof in terms of locomotive operation and construction although my invention is not limited in its application to a railway locomotive. I refer particularly to locomotives equipped with trailer trucks having two or more axles and pivoted to the locomotive frame adjacent the rear driver axle. A series of driving axles are mounted in the rigid main frame and can only accommodate curved track by limited lateral motion in the frame. The trailer truck wheels are similarly mounted in a rigid truck frame and can only accommodate curvature in the track by limited lateral movement in the truck frame. When the locomotive is on curved track, the center line of the frame adjacent the rear driver moves laterally of the center of the track a substantial distance and, accordingly, the adjacent end of the truck frame, pivoted to the main frame, has had to move laterally the same distance and this lateral movement of the end of the truck frame has called for excessive movement of one pair of the truck wheels, usually the front wheels.

In order to accommodate this excessive movement, it has been suggested that there be provision of greater lateral play between the journals and boxes and the boxes and frame, or both, for one of the truck axles, which play, if sufficient to meet the worst conditions, may be greater than is sanctioned by certain requirements of the Interstate Commerce Commission. Also it has been suggested that the elimination of flanges on the front wheels of the truck will permit the wheels and axle to move laterally of the track a sufficient distance to accommodate the lateral swing of the front end of the truck.

It is the object of my invention to meet the condition described by providing a connection between the front end of the truck and the locomotive frame which will compensate for the lateral movement of the locomotive frame and pivotally connect the front end of the trailer truck to the usual center plate provided on the frame but, at the same time, permit the radial center of the truck frame to depart from the axis of the center plate on the main frame.

With this general statement in mind, I refer to the accompanying drawings illustrating a selected embodiment of my invention in which—

Figure 1 is a top view of one longitudinal half of a truck frame and the adjacent portion of a locomotive frame interconnected by means of my compensating device.

Figure 2 is a side view of the same structure, a part of the structure being broken away.

Figure 5 is a vertical transverse section taken on the line 5—5 of Figure 4.

Figure 3:
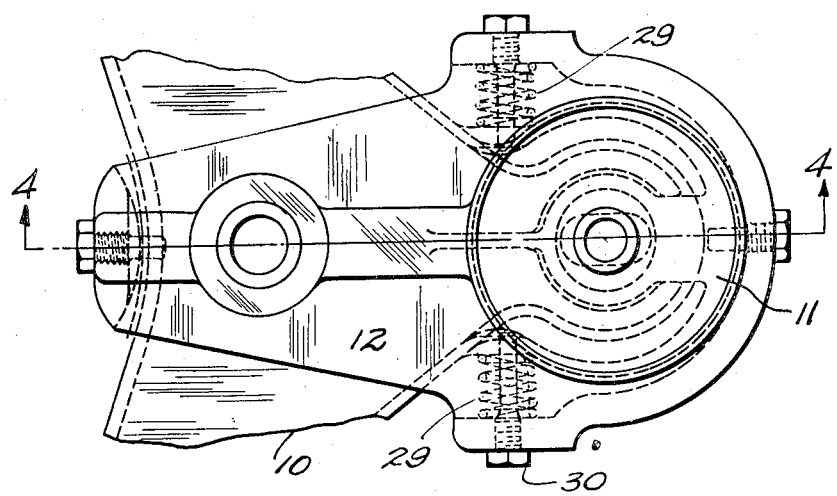
Figure 3 is a top view on an enlarged scale of the compensating device applied to the front end of the trailer truck frame.
Figure 4:
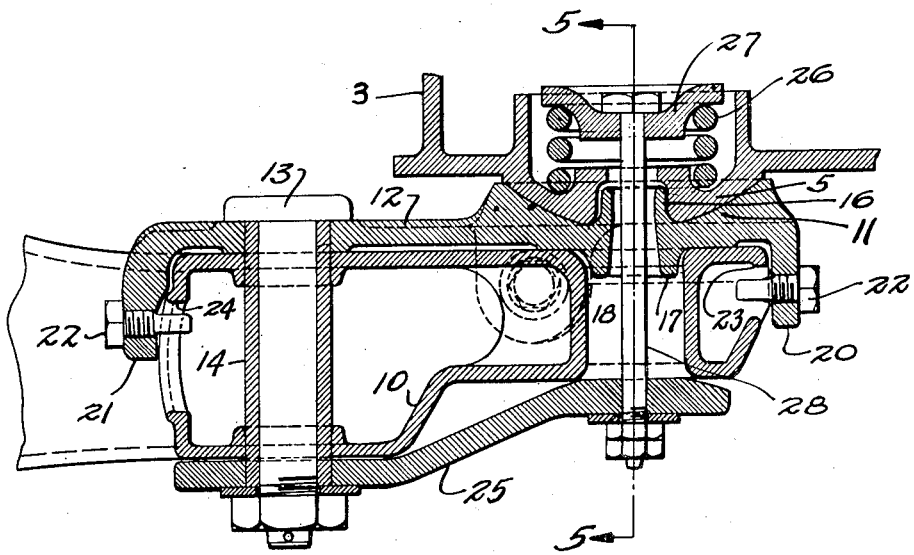
Figure 4 is a vertical longitudinal section taken on the line 4—4 of Figure 3 and showing the adjacent portion of the locomotive frame.

The locomotive main frame is indicated at 1 and may have a rearwardly extending cradle, as indicated at 2, and includes a transverse member 3 adjacent the rear driver 4 and provided with a center plate forming boss 5 (Figure 4).

The truck frame 6 is mounted upon two axles 7 and 8, respectively, and terminates at its rear end in pockets 9 for receiving rockers (not shown) for supporting the rear end of the main frame cradle in the usual manner. All of the above described structure is old in the art and, in itself, forms no part of my present invention.

Ordinarily the front transverse member 10 of the truck frame is provided with a recessed center plate member fitting the convex boss 5 provided on the main frame. My invention contemplates the elimination of this socket member on the truck frame and the substitution therefor of an intermediate center plate element 11 formed on the forward end of a link-like member 12, the rear end of which is pivoted to the transverse member 10 of the truck frame by means of a pin 13 preferably associated with a sleeve or bushing 14 and extending through the truck frame member 10 from top to bottom, as best shown in Figure 4.

Member 12 rests on top of the front end of the truck frame and the latter thrusts member 12 upwardly against boss 5 on the main frame, this thrust being provided by the spring equalizing system indicated at 15 which is of a familiar design and affords support for the main frame by the front end of the truck frame.

An upstanding circular rib 16 on element 11 fits into a suitable recess in boss 5 and a depending circular rib 17 on element 11 fits into a suitable opening 18 in the truck frame. The fit between rib 16 and the corresponding recess is fairly snug and only permits relative pivotal movement of the two parts. The fit between rib 17 and the sides of the corresponding opening in the truck frame is fairly snug lengthwise of the truck, as indicated in Figure 4, but is very loose transversely of the truck frame, as indicated in Figure 5.

This construction permits the adjacent pivotal portions of the main frame and truck frame to have relative movement transversely of the locomotive as indicated in Figure 1, in which the longitudinal center line of the main frame is indicated at A and the longitudinal center line of the truck frame is indicated at B, and these two lines, instead of intersecting at the axis of the center plate, as in the usual construction, intersect at C whereby the front end of the truck frame remains nearer to the right hand rail R than would be the case if the main frame and truck frame were provided with the usual center plate connection. Hence, axle 8 need not move so far towards the left hand rail L and the lateral movement of the rear end of the main frame is compensated for without removal of the flange of wheel 19 and without provision for abnormal play between the journal boxes of axle 8 and the truck frame.

Certain other features of my device are illustrated as contributing to its mechanical effectiveness. For example, the opposite ends of member 12 form depending lips 20 and 21 through which removable screws 22 are inserted and these screws extend through openings in the truck frame to engage surfaces 23 and 24 on the latter to prevent disassembly of the plate and truck frame. An underplate 25 is pivoted to the underside of the truck frame by pin 13 and sleeve 14 and extends forwardly beneath the center plate portion. In the event of the failure of the spring equalizing system the upward thrust of the truck frame against the main frame is insured by use of the spring 26 compressed between the upper face of boss 5 and a collar 27 which is held by a bolt 28 extending downwardly through the center plate structure and opening 18 and plate 25.

Horizontally disposed springs 29 compressed between the sides of member 12 and of truck member 10 tend to return the front end of the truck to a central position after the locomotive leaves the curved track and is again on straight track. These springs 27 are retained in position by bolts 30.

It will be understood that many of the details described are unnecessary to the embodiment of the main features of my invention and it is to be further understood that my invention may be applied to elements of railway rolling stock other than locomotive trailer trucks and I contemplate the exclusive use of those modifications of structure in my invention and such variation of applications of my invention as come within the scope of my claims.

I claim:

1. Means for pivotally connecting a railway truck member to a railway vehicle frame member, so as to compensate for relative lateral movement of the pivoted portions of the truck and frame, comprising a device having a portion arranged to pivotally engage the center plate element provided on one of said members and to slidably engage the adjacent part of the other of said members, and having a portion spaced from said first mentioned portion for pivotally engaging the latter of said members.

2. Means for pivotally connecting a railway truck to a railway vehicle frame, so as to compensate for relative lateral movement of the pivoted portions of the truck and frame, comprising a device having a portion arranged to pivotally engage the center plate elements of the vehicle and to engage and slide transversely of the corresponding part of the truck, and having a portion spaced from said first mentioned portion arranged to pivotally engage the truck.

3. Means for pivotally connecting a railway truck to a railway vehicle frame, so as to compensate for relative lateral movement of the pivoted portions of the truck and frame, comprising a device having a portion arranged to pivotally engage the center plate elements of the vehicle and to engage and slide transversely of the corresponding part of the truck, and having a portion spaced from said first mentioned portion arranged to pivotally engage the truck, and means for yieldingly engaging the truck so as to thrust the device and the truck into a normal centered relation.

4. In a railway truck having a plurality of axles, said truck having a member between one end of the truck and both of said axles for connection to a vehicle frame, and a device having a portion pivoted to said truck member and having a portion spaced longitudinally of the truck from said first mentioned portion and arranged for pivotal connection to the vehicle frame, whereby said truck member may move laterally of the adjacent part of the vehicle frame.

5. In a railway truck having a plurality of axles, a member at one side of said axles for connection to a vehicle frame, and a device having a portion pivoted to said truck member, at a point spaced from the end thereof, and having a part over the end of said member arranged to slidably engage the same and to pivotally engage the vehicle frame.

6. In combination, a railway vehicle frame having a downwardly facing center plate element, a truck including a frame with an end member extending beneath said center plate element, a connection for said frame and member comprising a device having a portion engaging said center plate element and a portion spaced from said first mentioned portion and pivoted to said truck member, said device being positioned between said center plate element and said member, and a plate beneath and frictionally engaging said member, there being vertical pins extending through said element, device and plate and through said device, member and plate, respectively.

7. In combination, a plural axle railway trailer truck, and a lateral compensator center plate pivoted at its back to said truck by a fixed pin and held to said truck at its front by a holding and laterally sliding pin arrangement.

8. In combination, a railway truck, a center plate arrangement which is pivoted at its back end connection and is slidably operative at its front connection, and an under connecting plate rotating on a fixed pin connection at the rear and on a sliding pin connection at the front.

9. The combination of a truck and vehicle center plate connecting device pivotally and slidably connected at the front end of a truck so that it will guide and lead the truck forwardly and backwardly, but permit the front end of the truck to move laterally of the vehicle, in combination with an under connection rotatably fixed at the rear and held by a sliding pin connection at the front.

10. In combination, a plural axle truck for a railway vehicle, including a frame arm connection to the vehicle, a member mounted on said arm, a pin pivotally connecting one end of said member to said arm, depending flanges on the other end of said member spaced from but arranged to engage the opposite sides of said arm to limit the relative lateral movement thereof, springs between said flanges and arm tending to thrust said member and arm into a centered position, and elements on the other end of said member for pivotal connection to the vehicle.

11. In combination, a railway locomotive main frame having a downwardly facing center plate element, a plural axle radial truck having a frame arm extending beneath and supporting said element, a connecting device for said main frame and truck frame arm comprising a horizontally disposed member lying between them and fitting said center plate element, and a pin pivotally connecting said device to said arm at the rear of said center plate element.

12. A combination as set forth in claim 11 which includes means for yieldingly holding said device against said center plate element.

13. A combination as set forth in claim 11 which includes means for centering said truck when said arm has moved laterally of the locomotive center line.

14. A combination as set forth in claim 11 which includes means at each end of said member for engaging said truck arm to prevent disassembly thereof by relative vertical movement.

CHARLES J. SCUDDER.